US012754718B2

(12) United States Patent
Gaur et al.

(10) Patent No.: US 12,754,718 B2
(45) Date of Patent: Oct. 6, 2026

(54) USER-CENTRIC AND LLM-ENHANCED ADAPTIVE ETL CODE SYNTHESIS

(71) Applicant: HITACHI, Ltd., Chiyoda-ku (JP)

(72) Inventors: Sudhanshu Gaur, Cupertino, CA (US); Takuya Habara, Santa Clara, CA (US); Shoji Yunoki, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 315 days.

(21) Appl. No.: 18/516,801

(22) Filed: Nov. 21, 2023

(65) Prior Publication Data

US 2025/0165231 A1 May 22, 2025

(51) Int. Cl.

| | |
|---|---|
| ***G06F 16/332*** | (2025.01) |
| ***G06F 8/35*** | (2018.01) |
| ***G06F 16/2458*** | (2019.01) |
| ***G06F 16/248*** | (2019.01) |
| ***G06F 16/25*** | (2019.01) |

(Continued)

(52) U.S. Cl.

CPC .............. *G06F 8/35* (2013.01); *G06F 16/254* (2019.01); *G06F 8/36* (2013.01); *G06F 11/3495* (2013.01); *G06F 16/211* (2019.01); *G06F 16/221* (2019.01); *G06F 16/24522* (2019.01); *G06F 16/24544* (2019.01); *G06F 16/2456* (2019.01); *G06F 16/2458* (2019.01); *G06F 16/248* (2019.01); *G06F 16/285* (2019.01); *G06F 16/3322* (2019.01); *G06F 16/3328* (2019.01);

(Continued)

(58) Field of Classification Search

CPC . G06F 8/35; G06F 8/36; G06F 16/254; G06F 16/3322; G06F 16/285; G06F 16/3328; G06F 16/335; G06F 16/24522; G06F 16/2458; G06F 16/3329; G06F 16/248; G06F 16/211; G06F 16/221; G06F 16/24544; G06F 16/2456; G06F 11/3495

See application file for complete search history.

(56) References Cited

U.S. PATENT DOCUMENTS

| | | | | |
|---|---|---|---|---|
| 10,719,667 | B1 | 7/2020 | Roy | |
| 12,111,859 | B2 * | 10/2024 | Siebel | G06N 3/045 |

(Continued)

OTHER PUBLICATIONS https://neuralwriter.com/prompt-tool Nov. 17, 2023; 3 pages.
https://python.langchain.com/docs/use_cases/question_answering Nov. 17, 2023; 18 pages.

*Primary Examiner* — Anibal Riveracruz
(74) *Attorney, Agent, or Firm* — PROCOPIO, CORY, HARGREAVES & SAVITCH LLP

(57) ABSTRACT

Systems and methods described herein involve program code generation for data processing programs, which can involve, for receipt of a user prompt, reference a prompt database that associates historical prompts, program code generated from the historical prompts, and information indicative of whether execution results of the program code were expected to generate a combined prompt from the user prompt and a historical prompt from the historical prompts determined to be related to the combined prompt from the referencing; reference a program template database that associates combinations of the historical prompts and historical program code that was verified to work as expected to generate program code with the combined prompt; and execute the generated program code and the combined prompt for the data processing programs.

15 Claims, 7 Drawing Sheets

(51) Int. Cl.

| | |
|---|---|
| ***G06F 16/335*** | (2019.01) |
| *G06F 8/36* | (2018.01) |
| *G06F 11/34* | (2006.01) |
| *G06F 16/21* | (2019.01) |
| *G06F 16/22* | (2019.01) |
| *G06F 16/2452* | (2019.01) |
| *G06F 16/2453* | (2019.01) |
| *G06F 16/2455* | (2019.01) |
| *G06F 16/28* | (2019.01) |
| *G06F 16/3329* | (2025.01) |

(52) U.S. Cl.

CPC ........ *G06F 16/3329* (2019.01); *G06F 16/335* (2019.01)

(56) References Cited

U.S. PATENT DOCUMENTS

| | | | | |
|---|---|---|---|---|
| 2024/0394600 | A1* | 11/2024 | Cunningham | G06Q 10/107 |
| 2024/0403005 | A1* | 12/2024 | Friddle | G06F 8/35 |
| 2025/0094171 | A1* | 3/2025 | Isaacson | G06F 9/30079 |
| 2025/0131020 | A1* | 4/2025 | Gupta | G06F 16/335 |
| 2025/0147990 | A1* | 5/2025 | Mathis | G06F 40/30 |
| 2025/0148289 | A1* | 5/2025 | Mukherjee | G06F 16/248 |
| 2025/0150474 | A1* | 5/2025 | Jones | G06N 3/08 |
| 2025/0156419 | A1* | 5/2025 | Shah | G06F 16/24522 |
| 2025/0156648 | A1* | 5/2025 | Skowronski | G06F 8/31 |

* cited by examiner

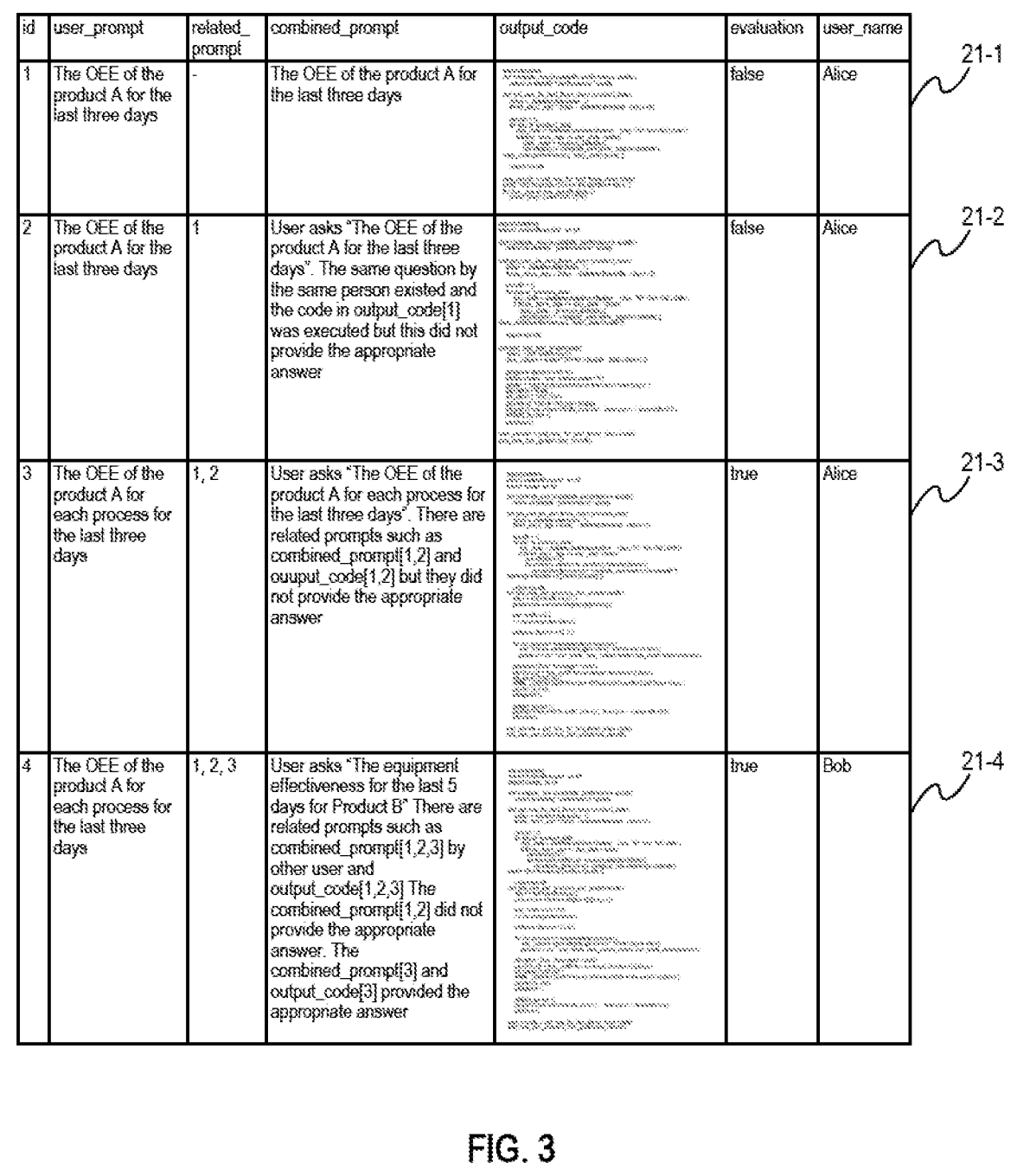

| id | user_prompt | related_prompt | combined_prompt | output_code | evaluation | user_name | |
|---|---|---|---|---|---|---|---|
| 1 | The OEE of the product A for the last three days | - | The OEE of the product A for the last three days | [illegible] | false | Alice | 21-1 |
| 2 | The OEE of the product A for the last three days | 1 | User asks "The OEE of the product A for the last three days". The same question by the same person existed and the code in output_code[1] was executed but this did not provide the appropriate answer | [illegible] | false | Alice | 21-2 |
| 3 | The OEE of the product A for each process for the last three days | 1, 2 | User asks "The OEE of the product A for each process for the last three days". There are related prompts such as combined_prompt[1,2] and ouuput_code[1,2] but they did not provide the appropriate answer | [illegible] | true | Alice | 21-3 |
| 4 | The OEE of the product A for each process for the last three days | 1, 2, 3 | User asks "The equipment effectiveness for the last 5 days for Product B" There are related prompts such as combined_prompt[1,2,3] by other user and output_code[1,2,3] The combined_prompt[1,2] did not provide the appropriate answer. The combined_prompt[3] and output_code[3] provided the appropriate answer | [illegible] | true | Bob | 21-4 |

FIG. 3

FIG. 4A
OEE for product A over the last three days
2023-09-27: 83.79%
2023-09-28: 80.15%
2023-09-29: 82.97%
FIG. 4B
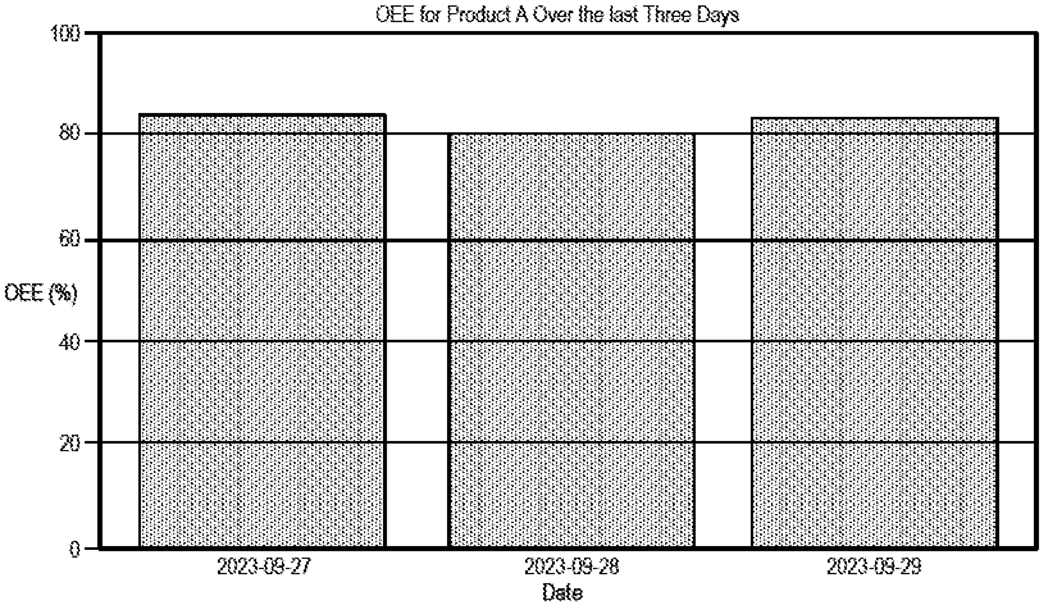
FIG. 4C
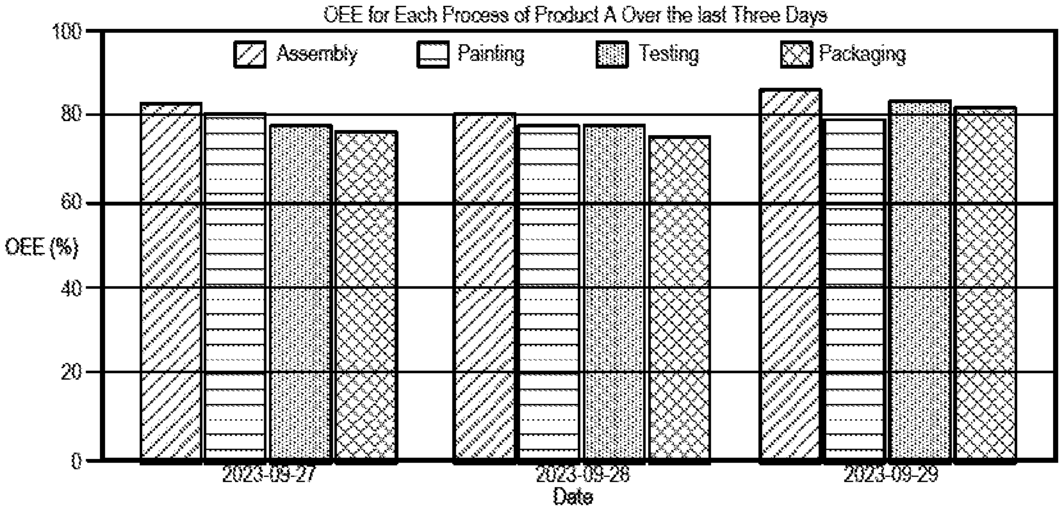

Program template database

| id | verified_prompt | verified_program_code | parameter |
|---|---|---|---|
| 1 | The OEE of the %[v_product] for each process for the %[v_days] | [illegible] | v_product,<br>v_days |
| | | | |

22-1

FIG. 5

USER-CENTRIC AND LLM-ENHANCED ADAPTIVE ETL CODE SYNTHESIS

BACKGROUND

Field

The present disclosure generally relates to data management systems, and more specifically, to facilitating stable output from Large Language Model (LLM) related processing.

Related Art

Many businesses today are engaged in digital transformation, which aims to improve operational efficiency and add value with digital technology. Digital transformation involves connecting different systems and sharing data. For example, data is shared and exchanged by connecting business-related systems including enterprise resource planning (ERP) systems, product lifecycle management (PLM) systems, manufacturing execution systems (MES), and so on. Such data may not follow a standard data model, and may follow the system's own data model instead. Therefore, Extract, Transform, Load (ETL) processing must be performed so that applications can take advantage of such data.

In related art ETL processing workflow generation methods, the data processing methods are manually generated to be compliant with each data model. Further, if each data source system uses its own data model, each system has to use its own tools, which creates the problem of high tool learning costs. In contrast, in the ETL processing workflow generation method using generative AI, the generative AI can absorb differences in the data model. Users can quickly generate the desired ETL processing workflow and obtain the desired data without knowledge of the details of the data model or the unique tools of the data source system.

However, the problem with generative AI based ETL processing is that the output of the generative AI is not constant or consistent. Even if the user inputs the same query, the ETL workflow generated by the generating AI may change, thereby resulting in a failure to obtain the intended output. A function that can stably output the ETL processing workflow desired by the user in a consistent manner is needed.

In a related art implementation, there is a method for obtaining desired answers to natural language queries. In such a related art implementation, there can be a natural language front end for using information stored in a knowledge base to augment natural language queries. Even if queries could be improved by using the related art system, it would not solve the problem of the lack of uniquely defined answers that occurs when using a generative AI.

In the related art, there are also systems and methods for adjusting prompt by querying related prompts. Such related art implementations can include methods for adapting user prompts based on successful prompts. However, successful prompts alone are not sufficient when querying a generative AI. It is necessary to use failure prompts as well in order to reach the desired information more quickly.

SUMMARY

The problem in using LLM based implementations (e.g., generative AI) for generating an ETL program code is that the output of the LLM is not constant or consistent.

Example implementations described herein involve systems and methods that divides a user query in natural language into a stationary portion and a parameter portion, and records both of them to a program template database as a template together with the result of the query (e.g., the ETL program code). Some LLM can be used in this parameterizing process. When a user inputs a similar query, the template is extracted from the program template database and the parameters of the new query are assigned to the parameter of the template. With this prompt, this system creates the ETL program code without using LLM (e.g., instead replaces the parameters in the template). The system avoids the problem of the LLM response not always being constant or consistent, and the desired output can thereby be obtained.

If the program template database does not contain a query similar to the query entered by the user, example implementations can create a new template without using the program template database. Generating ETL program code using LLM does not always generate the expected result. If the result is not as expected, the prompt entered by the user, the ETL program code generated, and the result of the judgment that the result was not as expected are recorded in the prompt database. Then, the ETL program code is generated again using LLM. Since the prompt database contains examples of ETL program code that are not as expected, the LLM generates different ETL program code. Repeating this process produces the desired ETL program code.

The output can be recorded in the program template database as described above to obtain the desired output for future similar queries.

Aspects of the present disclosure can involve a program code generation system for data processing programs which has a prompt database containing past prompts, the program code generated from those prompts, and the results of determining whether the program code execution results were as expected, and a program template database containing prompts and program code combinations that have been verified to work as expected to generate program code that works.

Aspects of the present disclosure can further involve a program code generation system, which has a parameterization unit which separates and stores parameters from verified prompts and program code if the execution result of the generated program code works as expected to uniquely output program code that works as expected by replacing only the parameter portion when similar prompts are executed.

Aspects of the present disclosure can further involve a program code evaluation unit which stores prompts, the program code generated from those prompts, and the results of determining whether the execution result of the program code was as expected or not, in the prompt database to allow reference as a past case when generating program code from similar prompts.

Aspects of the present disclosure can further involve a program code generation unit that generates program code repeatedly using past prompts stored in a prompt database to repeat many attempts without user operation when the execution result of the program code is not as expected.

Aspects of the present disclosure can include a method for program code generation for data processing programs, which can include, for receipt of a user prompt, referencing a prompt database that associates historical prompts, program code generated from the historical prompts, and information indicative of whether execution results of the program code were expected to generate a combined prompt from the user prompt and a historical prompt from the historical prompts determined to be related to the combined prompt from the referencing; referencing a program template database that associates combinations of the historical prompts and historical program code that was verified to work as expected to generate program code with the combined prompt; and executing the generated program code and the combined prompt for the data processing programs.

Aspects of the present disclosure can include a system for program code generation for data processing programs, which can include, for receipt of a user prompt, means for referencing a prompt database that associates historical prompts, program code generated from the historical prompts, and information indicative of whether execution results of the program code were expected to generate a combined prompt from the user prompt and a historical prompt from the historical prompts determined to be related to the combined prompt from the referencing; means for referencing a program template database that associates combinations of the historical prompts and historical program code that was verified to work as expected to generate program code with the combined prompt; and means for executing the generated program code and the combined prompt for the data processing programs.

Aspects of the present disclosure can include a computer program for program code generation for data processing programs, which can include instructions involving, for receipt of a user prompt, referencing a prompt database that associates historical prompts, program code generated from the historical prompts, and information indicative of whether execution results of the program code were expected to generate a combined prompt from the user prompt and a historical prompt from the historical prompts determined to be related to the combined prompt from the referencing; referencing a program template database that associates combinations of the historical prompts and historical program code that was verified to work as expected to generate program code with the combined prompt; and executing the generated program code and the combined prompt for the data processing programs. The computer program and instructions can be stored on a non-transitory computer readable medium and executed by one or more processors.

Aspects of the present disclosure can include an apparatus for program code generation for data processing programs, which can include a processor, configured to, for receipt of a user prompt, reference a prompt database that associates historical prompts, program code generated from the historical prompts, and information indicative of whether execution results of the program code were expected to generate a combined prompt from the user prompt and a historical prompt from the historical prompts determined to be related to the combined prompt from the referencing; reference a program template database that associates combinations of the historical prompts and historical program code that was verified to work as expected to generate program code with the combined prompt; and execute the generated program code and the combined prompt for the data processing programs.

BRIEF DESCRIPTION OF DRAWINGS

FIG. 3 is an illustration of the prompt database, in accordance with an example implementation.

FIGS. 4A to 4C illustrates example outputs, in accordance with an example implementation.

FIG. 5 is an illustration of the program template database, in accordance with an example implementation.

DETAILED DESCRIPTION

Figure 1:
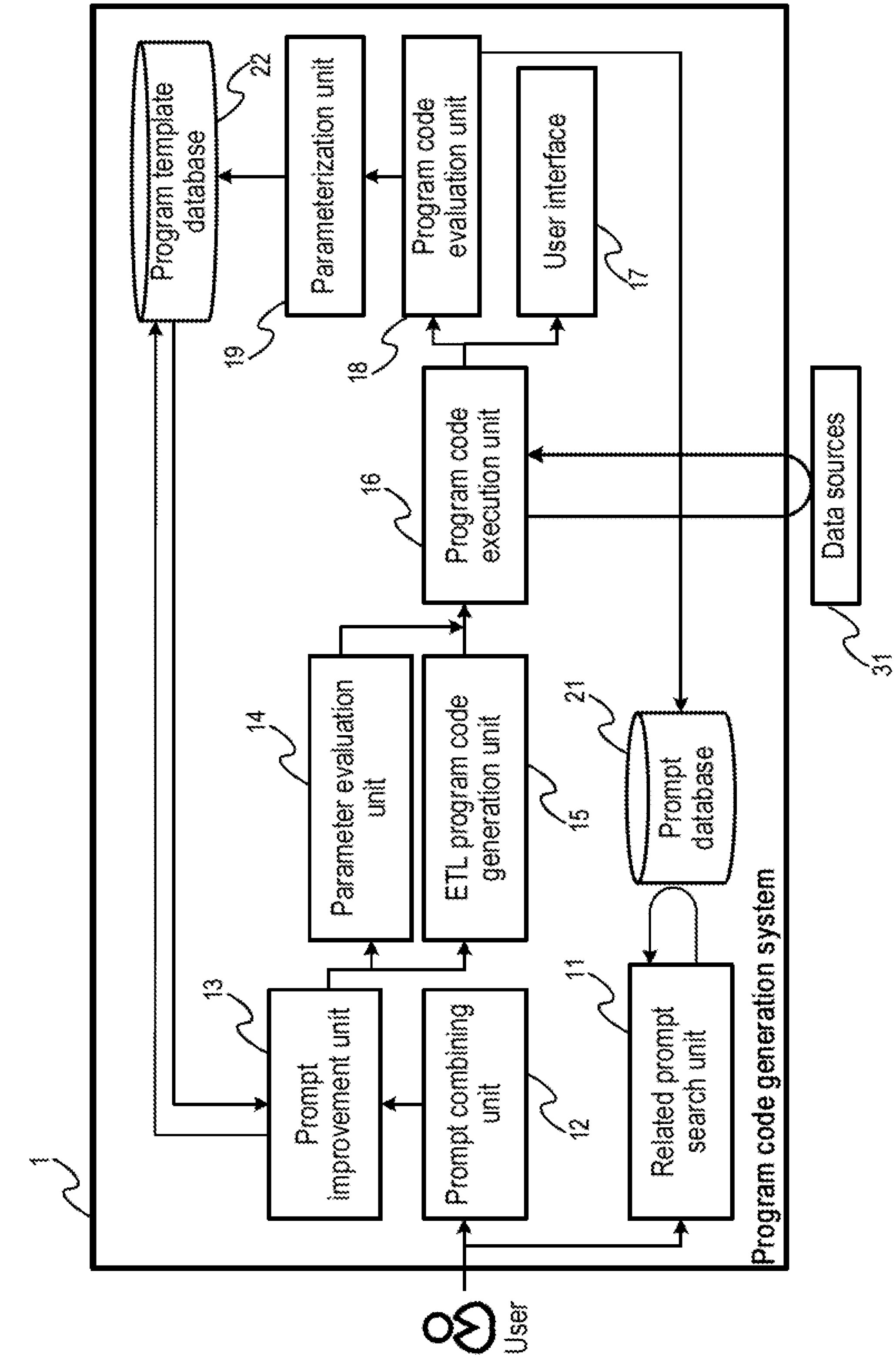
FIG. 1 is an illustration of the program code generation system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

In a first example implementation, an inquiry is provided by Alice, a worker who manages the process in an assembly plant. FIG. 1 illustrates the program code generation system (1), in accordance with an example implementation.

Data sources (31) contain data from various systems such as ERP systems, PLM systems, MES, and so on. The user obtains the necessary information for process management by performing ETL processing on this data.

The prompt database (21) contains IDs, prompts entered by users, record IDs of related prompts, prompts used to generate ETL program code, generated ETL program code, user evaluations of generated ETL program code, user names, and so on in accordance with the desired implementation.

The program template database (22) contains parameter-separated and verified prompts, parameter-separated and verified ETL program code, parameters, and so on, in accordance with the desired implementation. The type of data sources (31) can be included.

Figure 2:
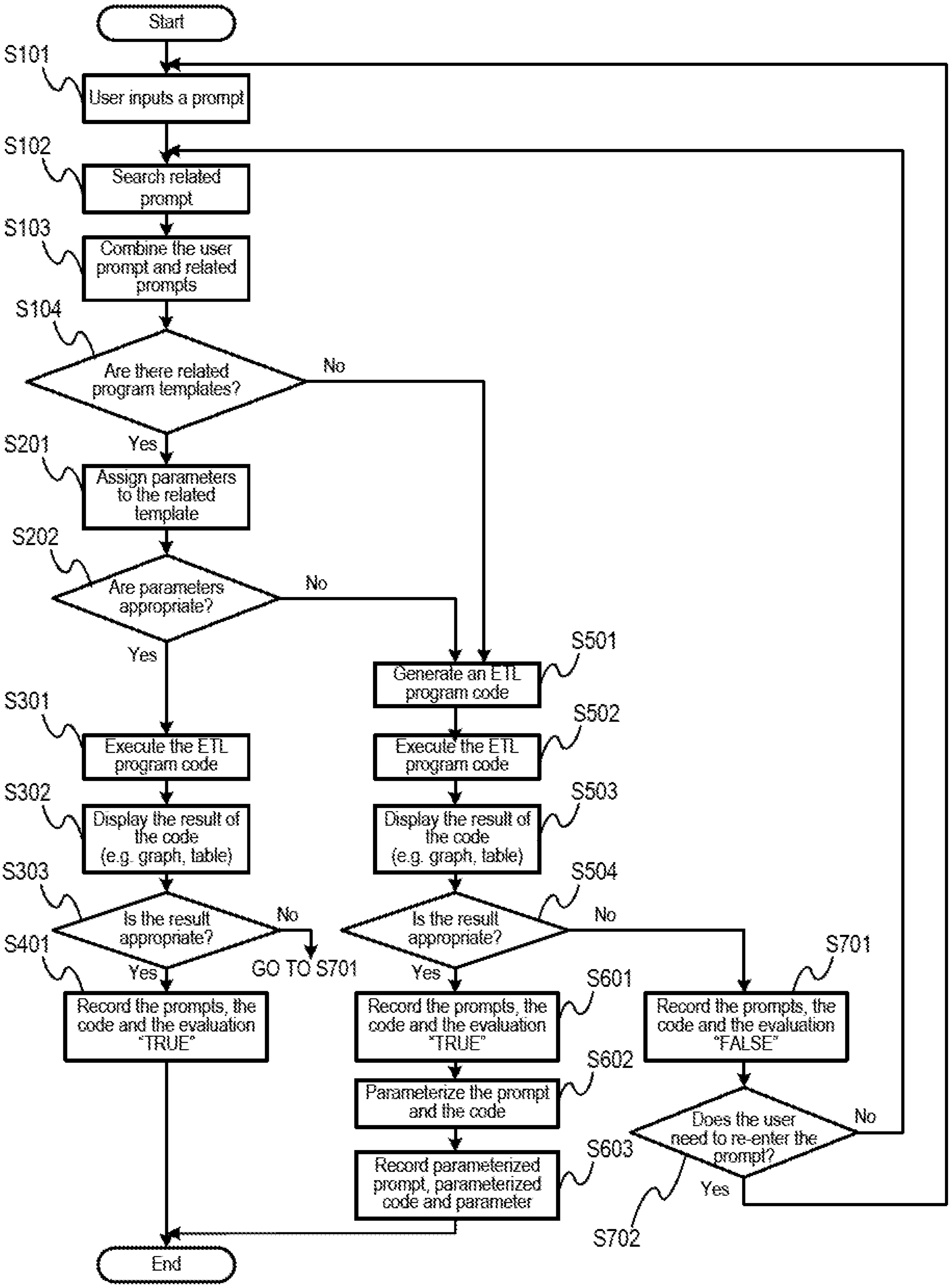
FIG. 2 is a flowchart of the program code generation, in accordance with an example implementation.

FIG. 2 illustrates the flowchart for program code generation, in accordance with an example implementation. The flowchart for program code generation is explained with respect to FIG. 1.

In step S101, the user inputs a prompt. An example prompt can be "The OEE of the product A for the last three days". This input can be done by keyboard, touch screen, voice, or otherwise in accordance with the desired implementation. The prompt input is stored in the related prompt search unit (11) and the prompt combining unit (12).

In step S102, the related prompt search unit (11) searches the prompt database (21) for prompts that are related to the prompt entered in step S101. The search may use vector search technology or other methods.

In step S103, the prompt combining unit (12) generates a combined prompt that combines the prompt entered by the user in step S101 with the related prompts found in step S102. In this example, since no related prompt was found in step S102, the prompt entered by the user in step S101 is the combined prompt.

In step S104, the prompt improvement unit (13) searches the program template database (22) for program templates that are related to the combined prompt generated in step S103. The search may use vector search technology or other methods. If it exists (Yes), then the flow proceeds to step S201. If not (No), then the flow proceeds to step S501. In this example, since no related program template was found, the flow proceeds to step S501.

In step S501, the ETL program code generation unit (15) generates the ETL program code using the combined prompt generated in step S103. The ETL program code can be generated using the Large Language Model (LLM) or any other method.

In step S502, the Program code execution unit (16) executes the ETL program code generated in step S501. The Program code execution unit (16) obtains data from the Data sources (31) and processes the data.

In step S503, the User interface (17) displays the results of step S502. The results may be displayed in text format, tabular format, graphical format, or generated as a binary for input to some visualization tools, or other methods can be used. In this example, the Overall Equipment Effectiveness (OEE) of the entire process was displayed numerically as shown in FIG. 4A.

In step S504, the Program code evaluation unit (18) receives the user's evaluation of whether the result of step S503 was appropriate or not. If it is appropriate, then the flow proceeds to step S601. If not, then the flow proceeds to step S701. In this example, the result of FIG. 4A is inappropriate because the user wanted a graphical output of the OEE for each process. Therefore, the flow proceeds to step S701.

In step S701, the program code evaluation unit (18) inputs information about the prompt to the prompt database (21). In this example, the information shown in 21-1 of FIG. 3 is entered. Specifically, the prompt entered by the user in step S101, the related prompt extracted in step S102, the combined prompt generated in step S103, the ETL program code generated in step S501, the evaluation result received in step S504, and the user name are entered.

In step S702, the system determines whether the user will re-enter the prompt or not. The system can determine the initial setting in advance or allow the user to select it each time. If the user re-enters the prompt, the flow proceeds to step S101. If the user does not re-enter the prompt, the flow proceeds to step S102. In this example, the user chooses not to re-enter the prompt. Therefore, the flow proceeds to step S102.

In step S102, the related prompt search unit (11) again searches the prompt database (21) for prompts that are related to the prompt entered in step S101.

In step S103, the prompt combining unit (12) generates a combined prompt that combines the prompt entered by the user in step S101 with the related prompts found in step S102. In this example, a related prompt (21-1) with ID=1 was found in step S102, so this information is combined and a prompt such as 'User asks "The OEE of the product A for the last three days". The same question by the same person existed and the code in output_code[1] was executed but this did not provide the appropriate answer' becomes the combined prompt.

In step S104, the prompt improvement unit (13) searches again the Program template database (22) for program templates that are related to the combined prompt generated in step S103. In this example, since no related program template was found, the flow proceeds to step S501.

In step S501, the ETL program code generation unit (15) generates the ETL program code again using the combined prompt generated in step S103.

In step S502, the program code execution unit (16) executes again the ETL program code generated in step S501. The program code execution unit (16) obtains data from the data sources (31) and processes the data.

In step S503, the user interface (17) displays the results of step S502. In this example, unlike FIG. 4A, the OEE of the entire process is displayed in a graph as shown in FIG. 4B In step S504, the program code evaluation unit (18) receives the user's evaluation of whether the result of step S503 was appropriate or not. In this example, the result of FIG. 4B is inappropriate because the user wanted a graphical output of the OEE for each process. Therefore, the flow proceeds to step S701.

In step S701, the program code evaluation unit (18) inputs information about the prompt to the prompt database (21). In this example, the information shown in 21-2 of FIG. 3 is entered.

In step S702, the system determines whether the user will re-enter the prompt or not. In this example, the user chooses to re-enter the prompt. Therefore, the flow proceeds to step S101.

In step S101, the user inputs the prompt. In this example, the input prompt is "The OEE of the product A for each process for the last three days".

In step S102, the Related prompt search unit (11) again searches the Prompt database (21) for prompts that are related to the prompt entered in step S101.

In step S103, the Prompt combining unit (12) generates a combined prompt that combines the prompt entered by the user in step S101 with the related prompts found in step S102. In this example since prompts (21-1, 21-2) with ID=1, 2 were found in step S102, such information is combined and a prompt such as 'User asks "The OEE of the product A for each process for the last three days". There are related prompts such as combined_prompt [1, 2] and output_code [1, 2], but they did not provide the appropriate answer' becomes the combined prompt.

In step S104, the prompt improvement unit (13) searches again the program template database (22) for program templates that are related to the combined prompt generated in step S103. In this example, since no related program template was found, the flow proceeds to step S501.

In step S501, the ETL program code generation unit (15) generates the ETL program code again using the combined prompt generated in step S103.

In step S502, the program code execution unit (16) executes again the ETL program code generated in step S501. The program code execution unit (16) obtains data from the data sources (31) and processes the data.

In step S503, the user interface (17) displays the results of step S502. In this embodiment, unlike FIG. 4A and FIG. 4B, the OEE of the each process is displayed in a graph as shown in FIG. 4C.

In step S504, the program code evaluation unit (18) receives the user's evaluation of whether the result of step S503 was appropriate or not. In this example, the result of FIG. 4C is evaluated to be appropriate. Therefore, the flow proceeds to step S601.

In step S601, the program code evaluation unit (18) inputs information about the prompt to the prompt database (21). In this example, the information shown in 21-3 of FIG. 3 is entered.

In step S602, the parameterization unit (19) parameterizes the prompt and code. The parameterization can be done using LLM or any other method. In this example, "the product A" in the prompt entered by the user in step S101 refers to the target product, and "the last three days" refers to the target period, so these are extracted as parameters. In addition, since "product_data" in the ETL program code generated in step S501 refers to the target product and "days=3" refers to the target period, these are extracted as parameters.

In step S603, the parameterization unit (19) inputs the prompts and codes parameterized in step S602 to the program template database (22). In this example, the information shown in 22-1 is entered.

Second Example Implementation

In a second example implementation of the inquiry by Bob, a worker who manages the process in an assembly plant.

In step S101, the user inputs the prompt "The equipment effectiveness for the last 5 days for Product B". The prompt input is stored in the related prompt search unit (11) and the prompt combining unit (12).

In step S102, the related prompt search unit (11) searches the prompt database (21) for prompts that are related to the prompt entered in step S101.

In step S103, the prompt combining unit (12) generates a combined prompt that combines the prompt entered by the user in step S101 with the related prompts found in step S102. In this embodiment, since prompts (21-1, 21-2, 21-3) with ID=1, 2, 3 were found in step S102, so this information is combined and a prompt such as 'User asks "The equipment effectiveness for the last 5 days for Product B". There are related prompts such as combined_prompt [1, 2, 3] by other user and output_code [1, 2, 3]. The combined_prompt [1, 2] and output_code [1, 2] did not provide the appropriate answer. The combined_prompt [3] and output_code [3] provided the appropriate answer' becomes the combined prompt.

In step S104, the prompt improvement unit (13) searches for the existence of a program template in the program template database (22) that is related to the combined prompt generated in step S103. In this example, the related program template (22-1, from FIG. 5) with ID=1 is found, so the flow proceeds to step S201.

In step S201, the prompt improvement unit (13) extracts parameters from the combined prompt generated in step S103 in the format indicated by the program template (22-1) extracted in step S104. The parameter extraction can be done using LLM or any other method. In this embodiment, extracted parameter "Product B" is assigned to the parameter "v_product" and "5 days" is assigned to "v_days" in program template (22-1). In addition, the prompt improvement unit (13) generates an ETL program code with the extracted parameters. The program code can be uniquely generated by the combination of "verified_program_code" and "parameter" recorded in the program template (22).

In step S202, the parameter evaluation unit (14) receives the user evaluation of whether the parameters extracted in step S201 are those intended by the user or not. If they are intended, then the flow proceeds to step S301. If not, then the flow proceeds to step S501 to generate the ETL program code as in the previous example. In this example, the parameters assigned in step S201 are those intended by the user. So, the flow proceeds to step S301.

In step S301, the program code execution unit (16) executes the ETL program code generated in step S201. The program code execution unit (16) obtains data from the data sources (31) and processes the data.

Figure 6:
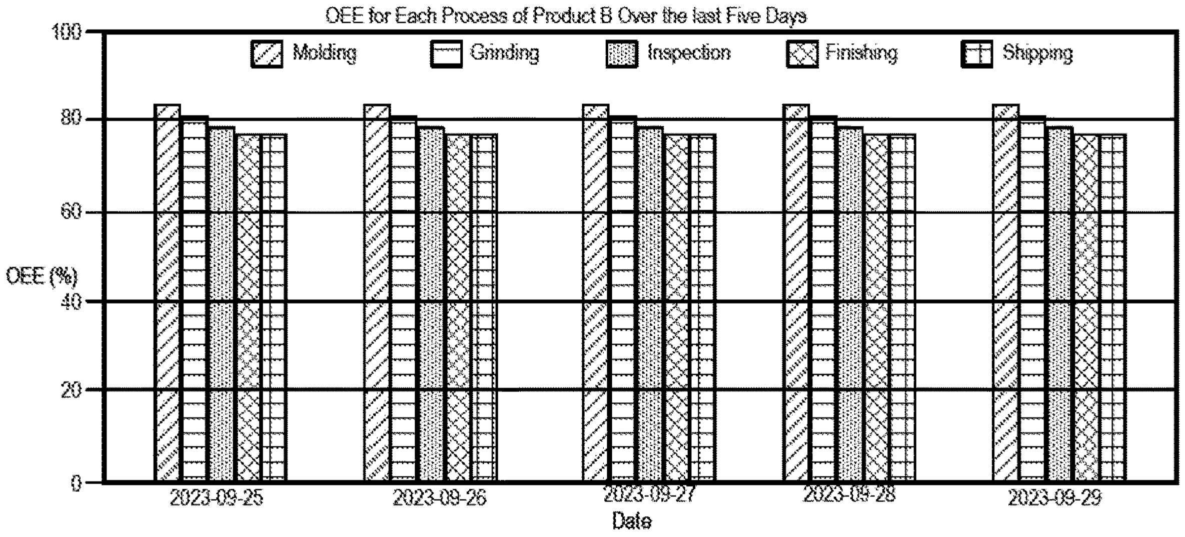
FIG. 6 illustrates another example output, in accordance with an example implementation.

In step S302, the user interface (17) displays the results of step S301. In this example, the OEE of Product B for each process is displayed in a graph as shown in FIG. 6.

In step S303, the program code evaluation unit (18) receives the user's evaluation of whether the result of step S302 was appropriate or not. If it is appropriate, then the flow proceeds to step S401. If not, then the flow proceeds to step S701 and review the prompt as in the previous example. In this example, the result of FIG. 6 is inappropriate. Therefore, the flow proceeds to step S401.

In step S401, the program code evaluation unit (18) inputs information about the prompt to the prompt database (21). In this example, the information shown in 21-4 as shown in FIG. 3 is entered.

Through the example implementations described herein, the prompt database (21) can be used to reference the history of prompts, including past failures, to quickly get the user's desired output. The program template database (22) can be used to use verified and executable ETL program code to overcome the disadvantage of LLMs that the output is not consistent. Further, through the example implementations, executable ETL program code can be more quickly and easily generated.

Figure 7:
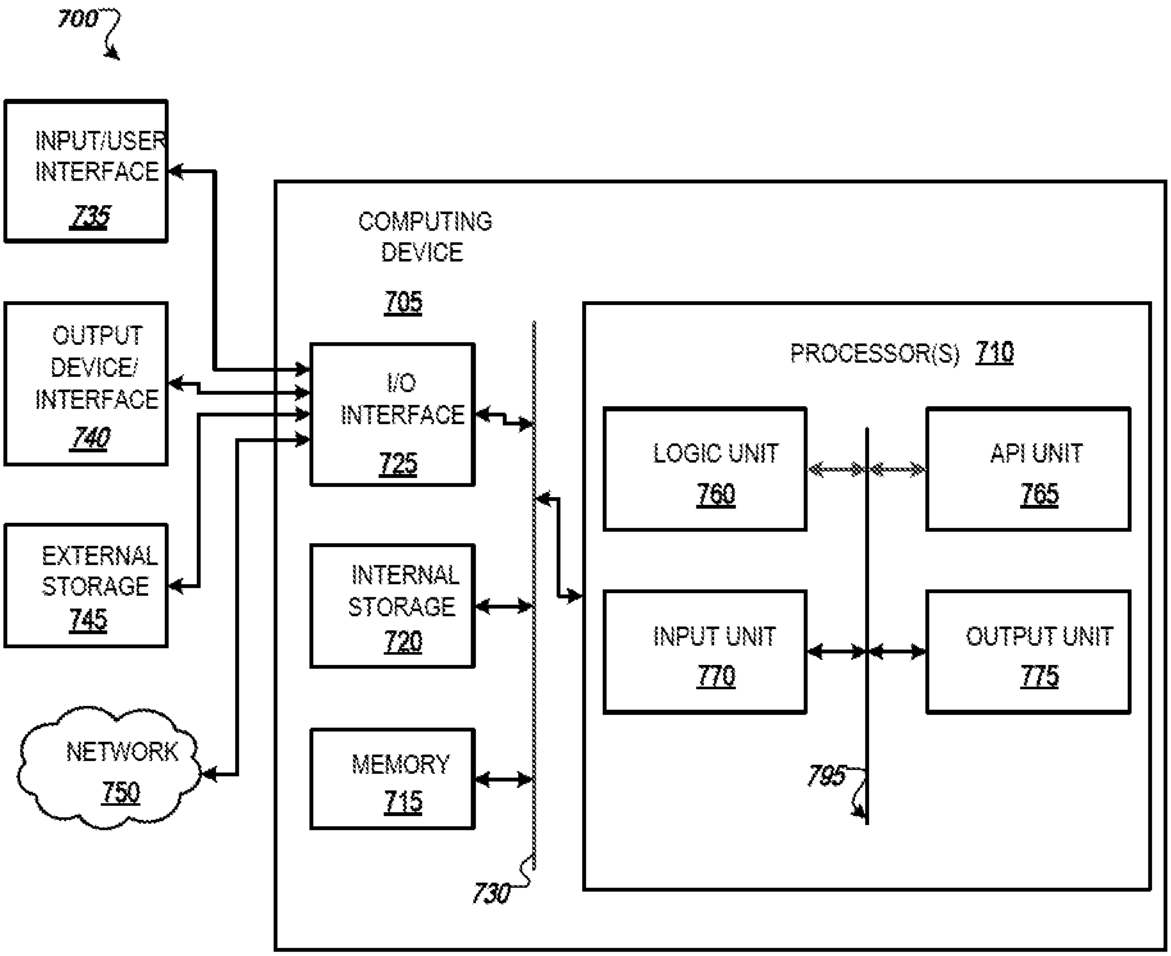
FIG. 7 illustrates an example computing environment with an example computer device suitable for use in some example implementations.

FIG. 7 illustrates an example computing environment with an example computer device suitable for use in some example implementations. Computer device 705 in computing environment 700 can include one or more processing units, cores, or processors 710, memory 715 (e.g., RAM, ROM, and/or the like), internal storage 720 (e.g., magnetic, optical, solid-state storage, and/or organic), and/or IO interface 725, any of which can be coupled on a communication mechanism or bus 730 for communicating information or embedded in the computer device 705. IO interface 725 is also configured to receive images from cameras or provide images to projectors or displays, depending on the desired implementation.

Computer device 705 can be communicatively coupled to input/user interface 735 and output device/interface 740. Either one or both of the input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via IO interface 725) to external storage 745 and network 750 for communicating with any number of networked components, devices, and systems, including one or more computer devices of the same or different configuration. Computer device 705 or any connected computer device can be functioning as, providing services of or referred to as a server, client, thin server, general machine, special-purpose machine, or another label.

IO interface 725 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, the input unit 770, the output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide an output based on the calculations described in example implementations.

Processor(s) 710 can be configured to conduct program code generation for data processing programs, which can include, for receipt of a user prompt (S101), referencing a prompt database that associates historical prompts, program code generated from the historical prompts, and information indicative of whether execution results of the program code were expected (S102) to generate a combined prompt from the user prompt and a historical prompt from the historical prompts determined to be related to the combined prompt from the referencing (S103); referencing a program template database that associates combinations of the historical prompts and historical program code that was verified to work as expected to generate program code with the combined prompt (S104, S201); and executing the generated program code and the combined prompt for the data processing programs (S301, S502) as illustrated in FIG. 2.

Processor(s) 710 can be configured to execute the method or instructions as described above, and further involve, for the execution of the generated program code and the combined prompt determined to work as expected (S504, S601), separating and storing parameters from the generated program code and the combined prompt (S601, S602, S603); and for receipt of a subsequent user prompt being similar to the combined prompt, replacing parameters of the generated program code with parameters associated with the subsequent user prompt (S301); and executing the generated program code with the parameters associated with the subsequent user prompt (S301, S302) as illustrated in FIG. 2.

Processor(s) 710 can be configured to execute the method or instructions as described above, and further involve storing the combined prompt, the generated program code prompt, and information indicating whether the execution of the generated program code and the combined prompt had an expected result in the prompt database as illustrated in FIG. 3.

Processor(s) 710 can be configured to execute the method or instructions as described above, which can include generating program code using historical prompts in the prompt database associated with program code associated with the information indicative of the execution results not being expected (S701) as shown in FIG. 2.

Depending on the desired implementation, the data processing programs can be part of an extract, transfer, load (ETL) system as described herein.

Depending on the desired implementation, the data processing programs can be part of a data analytics system. For example, the prompts and executable code can be used to generate data analytics algorithm on the underlying data to conduct data analytics and procure an analytics result.

Depending on the desired implementation, the executing the generated program code and the combined prompt for the data processing programs can be conducted by a generative artificial intelligence process configured to intake the combined prompt and the generated code and execute a process based on the input.

Processor(s) 710 can be configured to execute the method or instructions as described above, and further involve, for the referencing the prompt database resulting in none of the historical prompts being determined to be related to the user prompt, including the user prompt into the prompt database and executing a generative artificial intelligence process on the user prompt to execute a process based on the user prompt as illustrated as S501, S502, S503 of FIG. 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for program code generation for data processing programs, the method comprising:

for receipt of a user prompt:

referencing a prompt database that associates historical prompts, program code generated from the historical prompts, and information indicative of whether execution results of the program code were expected or not expected to generate a combined prompt from the user prompt and a historical prompt from the historical prompts determined to be related to the combined prompt from the referencing;

using historical prompts associated with program code that did not produce expected results to avoid generating similar unsuccessful program code;

referencing a program template database that associates combinations of the historical prompts and historical program code that was verified to work as expected to generate program code with the combined prompt; and executing the generated program code and the combined prompt for the data processing programs, wherein the data processing programs are part of an extract, transfer, load (ETL) system, wherein the prompt database stores user evaluations indicating whether generated ETL program code produced expected or unexpected results, and wherein the program code is iteratively regenerated using historical prompts associated with unexpected results until expected results are achieved.

2. The method of claim 1, further comprising, for the execution of the generated program code and the combined prompt determined to work as expected:

separating and storing parameters from the generated program code and the combined prompt; and for receipt of a subsequent user prompt being similar to the combined prompt:

replacing the stored parameters of the generated program code with parameters associated with the subsequent user prompt; and executing the generated program code with the parameters associated with the subsequent user prompt.

3. The method of claim 1, further comprising:

storing the combined prompt, the generated program code, and information indicating whether the execution of the generated program code and the combined prompt had an expected result in the prompt database.

4. The method of claim 1, further comprising:

generating the program code using the historical prompts in the prompt database associated with program code associated with the information indicative of the execution results not being expected.

5. The method of claim 1, wherein the data processing programs are part of a data analytics system.

6. The method of claim 1, wherein the executing the generated program code and the combined prompt for the data processing programs is conducted by a generative artificial intelligence process configured to intake the combined prompt and the generated code and execute a process based on the combined prompt and the generated code.

7. The method of claim 1, further comprising, for the referencing the prompt database resulting in none of the historical prompts being determined to be related to the user prompt, including the user prompt into the prompt database and executing a generative artificial intelligence process on the user prompt to execute a process based on the user prompt.

8. A non-transitory computer readable medium, storing instructions for program code generation for data processing programs, the instructions comprising:

for receipt of a user prompt:

referencing a prompt database that associates historical prompts, program code generated from the historical prompts, and information indicative of whether execution results of the program code were expected or not expected to generate a combined prompt from the user prompt and a historical prompt from the historical prompts determined to be related to the combined prompt from the referencing;

using historical prompts associated with program code that did not produce expected results to avoid generating similar unsuccessful program code;

referencing a program template database that associates combinations of the historical prompts and historical program code that was verified to work as expected to generate program code with the combined prompt; and executing the generated program code and the combined prompt for the data processing programs, wherein the data processing programs are part of an extract, transfer, load (ETL) system, and wherein the prompt database stores user evaluations indicating whether generated ETL program code produced expected or unexpected results, and wherein the program code is iteratively regenerated using historical prompts associated with unexpected results until expected results are achieved.

9. The non-transitory computer readable medium of claim 8, the instructions further comprising, for the execution of the generated program code and the combined prompt determined to work as expected:

separating and storing parameters from the generated program code and the combined prompt; and for receipt of a subsequent user prompt being similar to the combined prompt:

replacing the stored parameters of the generated program code with parameters associated with the subsequent user prompt; and executing the generated program code with the parameters associated with the subsequent user prompt.

10. The non-transitory computer readable medium of claim 8, the instructions further comprising:

storing the combined prompt, the generated program code, and information indicating whether the execution of the generated program code and the combined prompt had an expected result in the prompt database.

11. The non-transitory computer readable medium of claim 8, the instructions further comprising:

generating the program code using the historical prompts in the prompt database associated with program code associated with the information indicative of the execution results not being expected.

12. The non-transitory computer readable medium of claim 8, wherein the data processing programs are part of a data analytics system.

13. The non-transitory computer readable medium of claim 8, wherein the executing the generated program code and the combined prompt for the data processing programs is conducted by a generative artificial intelligence process configured to intake the combined prompt and the generated code and execute a process based on the combined prompt and the generated code.

14. The non-transitory computer readable medium of claim 8, further comprising, for the referencing the prompt database resulting in none of the historical prompts being determined to be related to the user prompt, including the user prompt into the prompt database and executing a generative artificial intelligence process on the user prompt to execute a process based on the user prompt.

15. An apparatus, storing instructions for program code generation for data processing programs, comprising:

a processor, configured to, for receipt of a user prompt:

reference a prompt database that associates historical prompts, program code generated from the historical prompts, and information indicative of whether execution results of the program code were expected or not expected to generate a combined prompt from the user prompt and a historical prompt from the historical prompts determined to be related to the combined prompt from the referencing of the prompt database;

use historical prompts associated with program code that did not produce expected results to avoid generating similar unsuccessful program code;

reference a program template database that associates combinations of the historical prompts and historical program code that was verified to work as expected to generate program code with the combined prompt; and execute the generated program code and the combined prompt for the data processing programs, wherein the data processing programs are part of an extract, transfer, load (ETL) system, wherein the prompt database stores user evaluations indicating whether generated ETL program code produced expected or unexpected results, and wherein the program code is iteratively regenerated using historical prompts associated with unexpected results until expected results are achieved.

* * * * *